United States Patent [19]

Shirodkar

[11] Patent Number: 5,725,772
[45] Date of Patent: Mar. 10, 1998

[54] WASTEWATER TREATMENT SYSTEM

[76] Inventor: Nikhil M. Shirodkar, 675 Washington Blvd., Baltimore, Md. 21230

[21] Appl. No.: 542,717

[22] Filed: Oct. 13, 1995

[51] Int. Cl.$^6$ .................... C02F 3/30; B01D 45/12
[52] U.S. Cl. .............. 210/622; 210/605; 210/626; 210/630; 210/787; 210/903
[58] Field of Search ................... 210/605, 620, 210/621, 622, 626, 630, 768, 787, 804, 903

[56] References Cited

U.S. PATENT DOCUMENTS

| | | | |
|---|---|---|---|
| 3,276,994 | 10/1966 | Andrews | 210/622 |
| 3,824,185 | 7/1974 | Caldwell et al. | 210/3 |
| 4,053,394 | 10/1977 | Fisk | 210/622 |
| 4,160,724 | 7/1979 | Laughton | 210/605 |
| 4,692,250 | 9/1987 | Miller | 210/622 |
| 4,721,569 | 1/1988 | Northrop | 210/622 |
| 4,780,208 | 10/1988 | Böhnke et al. | 210/605 |
| 5,022,993 | 6/1991 | Williamson | 210/605 |
| 5,160,043 | 11/1992 | Kos | 210/903 |
| 5,213,681 | 5/1993 | Kos | 210/605 |
| 5,252,214 | 10/1993 | Lorenz et al. | 210/622 |
| 5,288,405 | 2/1994 | Lamb, III | 210/605 |
| 5,290,451 | 3/1994 | Koster et al. | 210/605 |
| 5,348,653 | 9/1994 | Rovel | 210/605 |
| 5,380,438 | 1/1995 | Nungesser | 210/605 |

*Primary Examiner*—Neil McCarthy
*Assistant Examiner*—Theodore M. Green
*Attorney, Agent, or Firm*—Dickinson, Wright, Moon, Van Dusen & Freeman

[57] ABSTRACT

A system for treating wastewater wherein the need for the addition of an external carbon source during the denitrification step is reduced or eliminated. In accordance with the system, the centrate is removed from the centrifuge at the end of the treatment process and is fed back into the denitrification zone, where it serves as a carbon source during the denitrification reaction. By eliminating the need for an external carbon source, the operating costs of the system are dramatically reduced. Furthermore, since the centrate is not fed into the wastewater stream entering the plant and is therefore not subjected to unnecessary processing, the process is more efficient than existing methods.

4 Claims, 1 Drawing Sheet

1

WASTEWATER TREATMENT SYSTEM

FIELD OF THE INVENTION

This invention relates generally to wastewater treatment systems, and in particular to a system for treating wastewater wherein the centrate of the agglomerated wastewater is used as a carbon source in the denitrification process.

BACKGROUND OF THE INVENTION

Many systems are known to the prior art for treating raw sewage and other wastewater generated by industrial and municipal sources. In most systems, the wastewater is exposed to various bacteria which remove contaminants in the wastewater by consuming them as food sources or by utilizing them as oxygen sources. The wastewater entering a treatment facility may contain a wide assortment of biological and industrial waste products, including fecal matter, ammonia, urea, nitrates, sulfates, phosphates, heavy metals, and organic solvents.

In order to convert a food source into energy, bacteria require a source of oxygen. Dissolved Oxygen (DO) is the preferred source of oxygen for this purpose, since it allows bacteria to convert food into energy the fastest. Under aerobic conditions, various types of bacteria utilize DO to convert organic contaminants into carbon dioxide ($CO_2$) and other byproducts. Some bacteria also utilize DO to convert ammonia into nitrate ions ($NO_3^-$), a process known as nitrification.

When all of the DO has been depleted from the wastewater, the bacteria will utilize other oxygen sources to convert food into energy. Thus, under anaerobic conditions, some bacteria begin to utilize nitrate ions ($NO_3^-$) as an oxygen source, converting the nitrate ions into nitrogen gas in the process. This step is called denitrification, or anoxic metabolism. Analogous processes result in the removal of sulfates ($SO_4^-$) from the wastewater.

Conventional wastewater treatment plants utilize these processes to remove contaminants from wastewater. In most conventional systems, the treatment process is divided into a series of steps or zones, each of which is geared toward the removal of particular contaminants. The zones are often strategically arranged so that the byproducts produced in one zone will be used as carbon or oxygen sources in one or more successive zones. Thus, for example, many known systems for treating wastewater include at least one nitrification zone, wherein the ammonia content in the wastewater is converted under aerobic conditions into nitrates, followed by at least one denitrification zone, wherein the nitrate content in the wastewater is utilized by bacteria under anaerobic conditions as an oxygen source and is converted in the process into nitrogen gas.

After the wastewater has passed through all of the zones in the treatment process, it will still contain a significant amount of organic matter in the form of living or dead bacteria. The wastewater is therefore concentrated and passed to a clarifier, where a thickener is added to agglomerate the solution. Over time (typically 2-3 hours), the organic matter settles to the bottom of the clarifier as a sludge. The water is then discharged from the clarifier, and the sludge is removed for further processing.

One problem with existing wastewater treatment systems pertains to the treatment of sludge. In conventional systems, the sludge is separated into a solid component and a liquid component. The solid component is usually incinerated, buried, or made into derivative products such as fertilizer, while the liquid component is usually fed back into the raw sewage stream entering the plant for further treatment.

However, this procedure entails a significant amount of waste. In particular, the liquid component of sludge, which is often generated at a rate of tens of thousands of gallons weekly in a typical sewage treatment plant, is subjected to unnecessary processing steps. For example, the concentration of ammonia in this liquid may already have been reduced to acceptable levels by its passage through the nitrification zone.

Furthermore, the addition of the liquid component of sludge to the wastewater stream entering the plant tends to tax the overall system by boosting the level of organic material in the wastewater to abnormally high levels. There is thus a need for a system of wastewater treatment, wherein unnecessary processing of the liquid component of sludge is minimized.

Yet another problem with existing wastewater treatment systems pertains to the carbon content of the wastewater as it passes into the denitrification zone. In conventional systems, the carbon content of the wastewater is frequently depleted in the earlier steps of the treatment process. Consequently, there is often an insufficient concentration of organic material remaining in the wastewater to serve as a food source for the microorganisms during the denitrification process.

To date, wastewater treatment plants have dealt with this shortcoming by adding an external carbon source, such as methanol, during the denitrification process. However, the addition of an external carbon source significantly increases the operating costs of a wastewater treatment operation, often by hundreds of thousands of dollars annually. There is thus a need for a system for treating wastewater, wherein the need for an external carbon source is reduced or eliminated.

Surprisingly, it has been found that both of the aforementioned needs can be met by utilizing the liquid component of the sludge generated at the end of a conventional wastewater treatment process as a carbon source during the denitrification reaction, particularly when the liquid component is obtained by treating the sludge in a centrifuge. By shunting the centrate back into the denitrification zone, the need for an external carbon source is eliminated or significantly reduced. Furthermore, since the centrate is not subjected to the processing steps preceding the denitrification reaction, the overall efficiency of the treatment process is improved.

Some prior art references have generally proposed utilizing certain sewage products as a food source during the denitrification reaction. U.S. Pat. No. 5,288,405 (Lamb, III) is illustrative, and teaches the addition of primary sludge, wastewater, and septage during the denitrification process. U.S. Pat. No. 3,824,185 (Caldwell et al.), U.S. Pat. No. 5,213,681 (Kos), U.S. Pat. No. 5,022,993 (Williamson), and U.S. Pat. No. 5,380,438 (Nungesser) contain similar teachings. Lamb, III also describes a modification to the process disclosed therein in which a clarifier is used to thicken the partially treated wastewater in one of the side streams. The thinner fraction discharged from the clarifier is fed back into the anoxic zone.

While the methods described in these references are similar in certain respects to the present invention, none of these references recognize the benefits obtained by utilizing the liquid component derived from sludge as the food source during denitrification. The materials that are suggested for use as carbon sources by these references do not achieve the benefits of the present invention.

For example, the addition of wastewater or septage during the denitrification process reintroduces impurities into the wastewater stream that would otherwise have been removed or reduced to acceptable levels by the preceding processing steps. This has the effect of increasing the level of contaminants in the water leaving the plant, or necessitating further processing steps.

The addition during denitrification of the thinner fraction removed from the clarifier is also unsatisfactory. Due to the settlement process in the clarifier, this fraction will contain a low concentration of carbon sources. Consequently, it will be necessary to introduce a large volume of this fraction into the denitrification zone in order to provide a sufficient amount of food for the microorganisms responsible for denitrification. This results in process inefficiencies, and also slows down the rate of denitrification as a result of the dilution factors involved.

The addition of primary sludge to the denitrification zone is also less efficient than the addition of a centrate derived from sludge, in part because primary sludge is not assimilated as a food source as rapidly as is the centrate derived from sludge. This is due in part to the fact that primary sludge contains a significant portion of dead microorganisms and other organic matter which must be broken down further before it can be utilized as a food source. By contrast, the centrate is composed largely of simpler organic chemicals which are readily assimilated by the bacteria.

SUMMARY OF THE INVENTION

The present invention is an improved system for treating wastewater, wherein the need for the addition of an external carbon source during the denitrification process is eliminated. In the system of the present invention, the centrate is removed from the centrifuge at the end of the treatment process and is fed back into the denitrification zone to serve as a carbon source. By eliminating the need for an external carbon source, the operating costs of the system are dramatically reduced. Furthermore, since the centrate is not fed into the wastewater stream entering the plant and is therefore not subjected to unnecessary processing steps, overall process efficiency is improved.

PREFERRED EMBODIMENTS OF THE INVENTION

Figure 1:
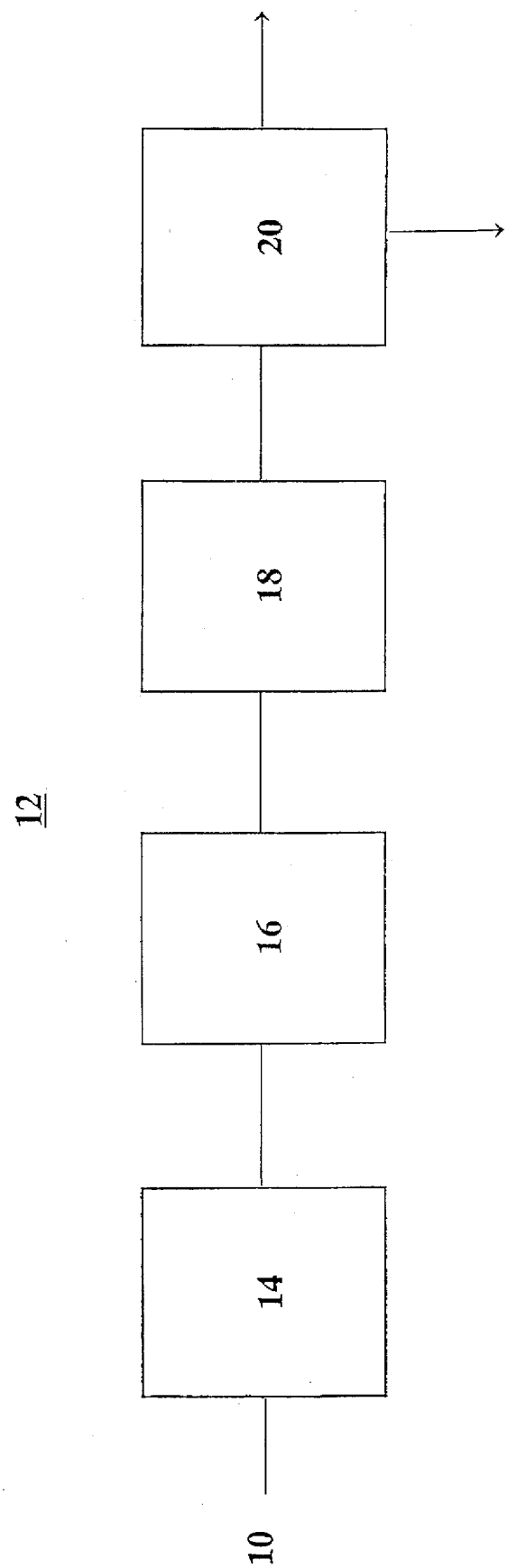
FIG. 1 is a schematic diagram of the process of the present invention.

FIG. 1 illustrates the wastewater treatment system of the present invention. Raw wastewater from municipal or industrial sources is fed into the head 10 of a wastewater treatment plant for processing. The treatment system 12 within the plant is divided into a plurality of zones, including an aerobic zone 14, a nitrification zone 16, and an anoxic or denitrification zone 18.

The zones are preferably placed in successive order, with the wastewater passing first into the aerobic zone, then into the nitrification zone, and finally into the anoxic zone.

In the aerobic zone, various types of bacteria utilize DO under aerobic conditions to convert organic contaminants into carbon dioxide ($CO_2$) and other byproducts. The level of DO in the wastewater may be optimized by agitating the wastewater in an oxygen-containing environment.

Agitation of the wastewater may be accomplished through the use of stirring mechanisms, turbines, sprinkler systems, turbulent flow channels, and the like. Agitation is preferably accomplished within the first aerobic zone, although in some embodiments the wastewater is agitated prior to, or during, its introduction into the first aerobic zone. The agitating means may be run continuously, or it may be activated only when sensors indicate that the DO content in the wastewater has fallen below a certain predetermined level.

Preferably, the oxygen environment of the first aerobic zone is that provided by exposing the wastewater to ambient conditions. However, the present invention also contemplates the use of an oxygen-rich atmosphere in the aerobic zone, such as that provided by a source of pure oxygen gas. Alternatively, chemical oxidizers, such as peroxides, may be added to the wastewater in place of, or as a supplement to, physical agitation of the wastewater. In some embodiments, the oxygen level in the atmosphere to which the wastewater is exposed can also be adjusted to an oxygen-poor condition to compensate for too high of a DO level in the wastewater. Preferably, the DO level in the aerobic zone is continuously monitored, and is increased or decreased as dictated by process constraints.

In the nitrification zone, bacteria utilize DO to convert the ammonia content of the wastewater into nitrate ions ($NO_3^-$) Preferably, the concentration of ammonia and/or nitrate ion is continuously monitored, with the residence time of the wastewater in the nitrification zone determined by the length of time needed for the concentration of ammonia or nitrate to fall below a predetermined level. In some embodiments, however, the residence time of the wastewater in the nitrification zone may be fixed, or subject to predetermined maximum or minimum residency requirements. Where necessary to improve the overall efficiency of the system, the concentration of ammonia or nitrate in the wastewater may be adjusted at any step to a desired level.

The conditions in the denitrification zone are anaerobic, due to the depletion of- DO in the wastewater in the preceding nitrification zone. Therefore, the bacteria utilize nitrate ions ($NO_3^-$) as an oxygen source, converting the nitrate ions into nitrogen gas in the process.

A process analogous to that effecting denitrification results in the removal of sulfates from the water. Thus, as the nitrate content in the wastewater becomes depleted by denitrification, the bacteria will begin to utilize sulfates as an oxygen source. In the present invention, this later process may be accomplished in the denitrification zone itself, or it may be carried out in a separate zone where conditions are optimal for the removal of sulfates from the wastewater stream.

After the wastewater has passed through the denitrification zone and any further waste removal steps, it is placed in a clarifier 20, where any suspended organic matter remaining in the wastewater gradually settles to the bottom as a sludge. A thickener or flocculating agent may be added to the solution in the clarifier to accelerate the sedimentation process. Many flocculating agents suitable for this purpose are known to the art, and include both inorganic agents, such as lime, alum, and ferric chloride, and organic agents, such as polyethyleneimine, polyacrylic acid salts, and other polyelectrolytes.

After the suspended matter has settled from the wastewater in the form of a sludge, the water is withdrawn from the clarifier. Typically, the water will be clean enough to be discharged from the plant at this point. However, the present invention also contemplates embodiments wherein the wastewater is subjected to further treatment after it exits the clarifier if the levels of contaminants have not been sufficiently reduced. If such is the case, the wastewater exiting from the clarifier may be rerouted to one or more earlier points in the treatment process, or may be shunted to additional treatment facilities designed to effect the removal of specific impurities, such as heavy metals.

The sludge generated in the clarifier is removed and placed in a centrifuge, where it is separated into a substantially solid component and a substantially liquid component or centrate. Centrifuges suitable for separating the solid and liquid components of sludge are well known to the prior art. The solid component obtained from the centrifugation of the sludge is then disposed of, as by incineration, burial, or processing into fertilizer or other derivative products. The centrate from the centrifugation process, which is rich in carbon content, is returned to the denitrification zone for use as a carbon source.

In the preferred embodiment, the centrate is transferred to the denitrification zone by a suitable conduit, such as stainless steel or polyvinylchloride piping. The conduit may be equipped with control valves to ensure a one-way flow of centrate into the denitrification zone. Other controls may also be provided to regulate the flow of centrate into the denitrification zone in response to variations in the concentration of suitable carbon sources in the denitrification zone. The conduit may further be equipped with one or more reservoirs for holding the centrate until it is needed.

While the centrate will ordinarily serve as at least a component of the carbon source in the present invention, and will often meet the entire demand for a carbon source, the invention also contemplates the need from time to time to supplement the centrate with external carbon sources such as methanol. Such may be the case, for example, when the yield of centrate is inadequate to meet the needs of the denitrification process, or when the centrifugation process has to be shut down for routine maintenance. When it is needed, the external carbon source may be metered directly into the denitrification zone, or it may be premixed with the centrate. When the external carbon source is premixed with the centrate, it may be subject to suitable agitation to achieve a uniform mixture.

In addition to the steps noted above, environmental variables may be controlled throughout the entire wastewater treatment process so as to ensure optimal results and efficiency. Thus, the temperature of the wastewater may be controlled through appropriate heating or cooling to maintain it within an optimal range. The pH of the wastewater may also be maintained at optimal levels through the addition of chemical agents or buffers. The atmospheric pressure in each zone may likewise be regulated.

Furthermore, while the ordering of the processing zones as given above is preferred, other embodiments are contemplated wherein the ordering of the zones is modified, or wherein one or more of the zones is eliminated, to optimize the efficient treatment of wastewater from particular sources. Additional zones may also be added to improve process efficiency, or to remove special contaminants, such as heavy metals, which may be peculiar to a particular source of wastewater. The invention also contemplates embodiments wherein two or more zones are arranged in parallel, with a continuous or synchronized flow of wastewater between them.

In some embodiments, two or more zones (i.e., the aerobic and nitrification zones) may be consolidated into a single zone. Also, while it is preferred that the zones are physically separated into discrete containment areas within the wastewater treatment system, the invention also contemplates embodiments wherein the zones are arranged as indefinite regions along the flow of the wastewater processing stream.

The above description is intended to convey an understanding of the present invention. Modifications within the scope of the invention will be obvious to those skilled in the art. Therefore, the scope of the invention should be determined solely by reference to the appended claims.

We claim:

1. In a method for treating wastewater by introducing raw wastewater to a head of a wastewater treatment process which has at least an aerobic process, and a denitrification process downstream of the aerobic process, passing the wastewater through the aerobic and denitrification processes, forming a sludge from each of the aerobic and denitrification processes, subjecting each sludge to a thickening step, and recycling a liquid component of each thickened sludge to the head of the wastewater treatment process, the improvement comprising eliminating or removing a need for adding an external carbon source to the denitrification process by the steps of:

a) centrifuging the thickened sludge into a substantially solid component and a centrate; and b) supplying a carbon source to the denitrification process by recycling the centrate directly to the denitrification process.

2. The method of claim 1, wherein gravitational separation is used as said forming step.

3. The method of claim 1, wherein the aerobic process further comprises a carbon removal process and a nitrification process.

4. The method of claim 1, wherein a conduit is used to recycle the portion of the centrate to the denitrification process.

* * * * *